US007017601B2

(12) United States Patent
Soga et al.

(10) Patent No.: US 7,017,601 B2
(45) Date of Patent: Mar. 28, 2006

(54) ELECTROMAGNETIC VALVE

(75) Inventors: Hidehiro Soga, Tokyo (JP); Kenji Nakao, Tokyo (JP); Kouichi Ojima, Tokyo (JP); Yuji Bando, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 99 days.

(21) Appl. No.: 10/459,510

(22) Filed: Jun. 12, 2003

(65) Prior Publication Data

US 2004/0089353 A1 May 13, 2004

(30) Foreign Application Priority Data

Nov. 12, 2002 (JP) ...................................... 2002-327903

(51) Int. Cl.
*F16K 49/00* (2006.01)

(52) U.S. Cl. .............. 137/339; 137/596.17; 251/129.22

(58) Field of Classification Search ................. 137/339, 137/596.17; 251/129.02, 129.22

See application file for complete search history.

(56) References Cited

U.S. PATENT DOCUMENTS

| | | | | | |
|---|---|---|---|---|---|
| 1,270,170 | A | * | 6/1918 | Kingsbury | 137/339 |
| 1,587,921 | A | * | 6/1926 | Ray | 137/339 |
| 5,060,695 | A | * | 10/1991 | McCabe | 137/625.61 |
| 5,282,604 | A | * | 2/1994 | Wade | 137/625.61 |
| 5,785,087 | A | * | 7/1998 | Takahashi et al. | 137/339 |

FOREIGN PATENT DOCUMENTS

JP 08-105563 B2 4/1996

* cited by examiner

*Primary Examiner*—Gerald A. Michalsky
(74) *Attorney, Agent, or Firm*—Sughrue Mion, PLLC

(57) ABSTRACT

An electromagnetic valve of a reduced size capable of suppressing temperature rise of a coil regardless of continuous electrical energization over an extended time while preventing attracting force from lowering includes a coil cooling fluid passage (9*a*; 8*a*; 4*a*) for communicating a coil cooling fluid sump space (2*a*) with a controlled pressure region for allowing a fluid to flow into the coil cooling fluid sump space (2*a*) from the controlled pressure region. The coil cooling fluid passage includes a small-diameter communicating passage portion (9*a*) provided so as not to exert influence to a hydraulic pressure prevailing in the controlled pressure region.

6 Claims, 10 Drawing Sheets

WHEN DEENERGIZED

WHEN ENERGIZED

ELECTROMAGNETIC VALVE

BACKGROUND OF THE INVENTION

1. Field of the Invention

The present invention generally relates to an electromagnetic valve having a valve element which is arranged to close a fluid passage upon electrical energization of the electromagnetic valve. More particularly, the present invention is concerned with an improvement of the electromagnetic valve of such a structure in which the fluid under control (i.e., controlled fluid) is incapable of flowing around a coil upon electrical energization thereof.

2. Related Art

A three-way electromagnetic valve which has an input port, an output port and a drain or discharge port and is designed to changeover the fluid passages formed between the ports in response to electrical energization and deenergization of a coil is heretofore known. The electromagnetic valve includes in general a plunger housed within a plunger chamber and driven by the coil, a rod connected to the plunger at an end thereof, a first valve element of a conical shape formed in the rod at an intermediate portion thereof and a second valve element disposed so as to contact with a tip end of the rod.

In the state where the coil is not electrically deenergized, the second ball-like shaped valve element is pressed against a second valve seat to close the passage between the input port and the output port whereas the first valve element is detached from the first valve seat to place the output port and the discharge port in communication with each other.

On the other hand, when the coil is electrically energized, the plunger is driven or actuated to force the first valve element to bear on the first valve seat to thereby block the passage extending between the output port and the drain or discharge port while the second valve element is pushed downwards to move the second valve element from the second valve seat, whereby the input port and the output port are hydraulically communicated to each other. For more particulars, reference may have to be made to Japanese Patent No. 3219611.

As is apparent from the above, in the conventional electromagnetic valve of the structure mentioned above, the passage extending between the output port and the drain or discharge port is closed when the coil is electrically energized. In this state, no fluid under control can flow around or in the vicinity of the coil. Consequently, when the state in which the coil is electrically energized with the passage between the output port and the discharge port being blocked continuous for an extend time, there will arise a problem that the temperature of the coil increases. When the temperature of the coil rises, the electric resistance of the coil increases, causing the electric current flowing through the coil to be decreased, as a result of which the magnetic attraction for driving the plunger is lowered, giving rise to a problem. In order to increase the plunger attracting force even when the coil temperature rises, the coil has to be implemented in a large size or the conductor material of the coil has to be correspondingly selected or changed.

SUMMARY OF THE INVENTION

In the light of the state of the art described above, it is as an object of the present invention to provide an electromagnetic valve of an improved structure which allows the electromagnetic valve to be electrically energized over an extended time period without incurring temperature rise of the coil to thereby prevent the plunger attracting force from being lowered due to the increase of the coil temperature rise and which can thus be implemented in a small size.

In view of the above and other objects which will become apparent as the description proceeds, there is provided according to a general aspect of the present invention an electromagnetic valve which includes a valve seat assembly composed of a high pressure port opened in a controlled pressure region of a high pressure, a low pressure port opened in a discharge or drainage region of a low pressure, a fluid passage formed between the high pressure port and the low pressure port and a valve seat formed in the fluid passage, and a plunger assembly composed of a plunger disposed to be slideable reciprocatively within a column-like hollow plunger chamber and a valve element provided at one end portion of the plunger so as to open and close the fluid passage in cooperation with the valve seat.

The electromagnetic valve further includes a coil housed within a case for driving the plunger upon electrical energization of the coil to thereby displace the plunger assembly to a valve-closed position at which the fluid passage is closed by the valve element while upon electrical deenergization of the coil, the plunger assembly is displaced to a valve-opened position at which the fluid passage is opened by the valve element under the influence of hydraulic pressure prevailing in the controlled pressure region.

Further, the electromagnetic valve includes a coil cooling fluid sump space provided between an outer peripheral portion of the coil and the case, and a coil cooling fluid passage provided so as to communicate the coil cooling fluid sump space with the controlled pressure region for allowing a fluid to flow into the coil cooling fluid sump space from the controlled pressure region. The coil cooling fluid passage incorporates a small-diameter communicating passage portion provided so as not to exert influence to the hydraulic pressure prevailing in the controlled pressure region.

By virtue of the structure described above, the temperature rise of the coil can effectively be suppressed even when the coil is electrically energized continuously over an extended time period which in turn means that the attracting force can be protected from lowering, which may otherwise occur in accompanying the temperature rise of the coil. Owing to this feature, the electromagnetic valve can be implemented compactly in a miniature size.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

The present invention will be described in detail in conjunction with what is presently considered as preferred or typical embodiments thereof by reference to the drawings.

Embodiment 1

Figure 1:
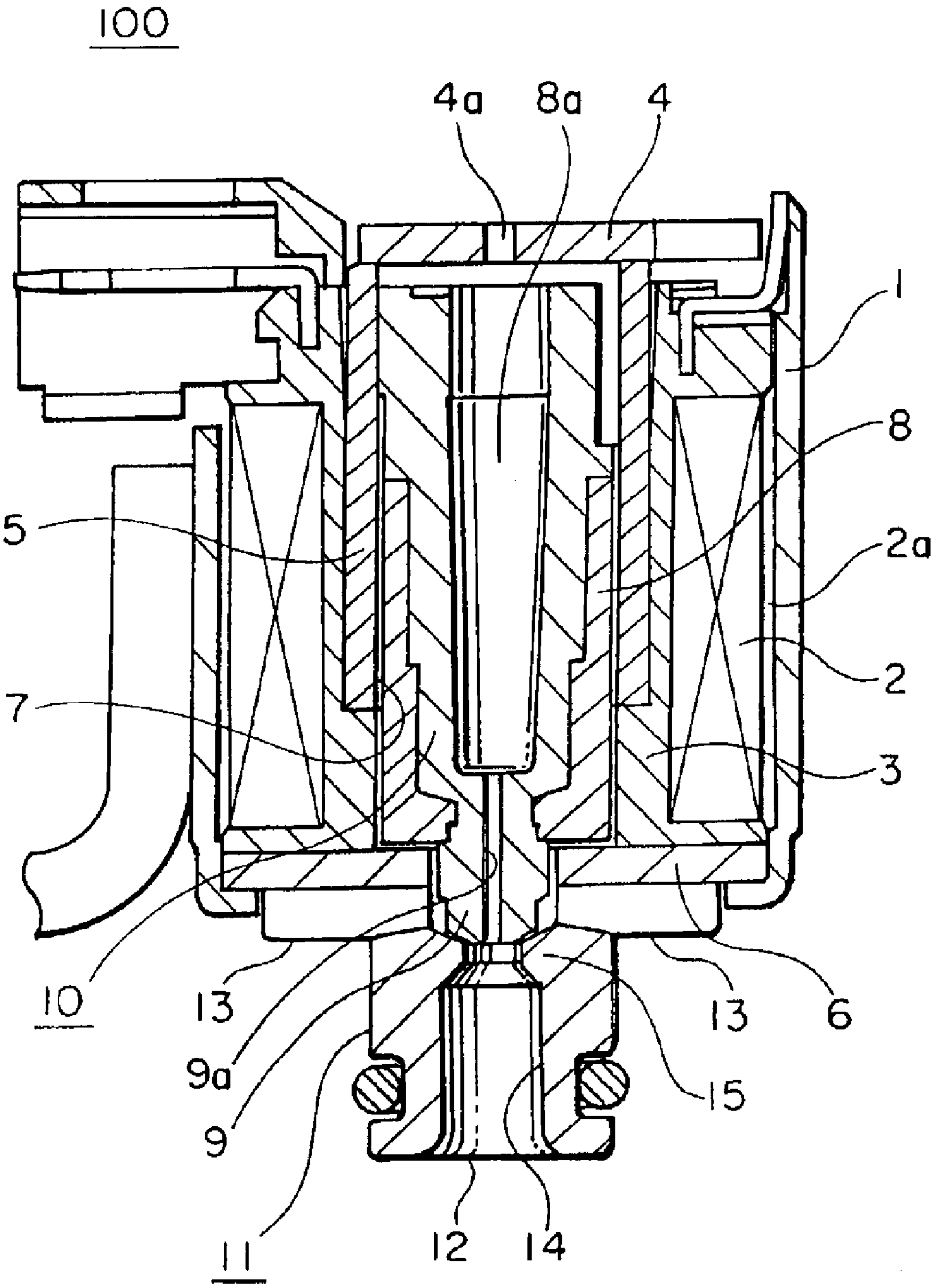
FIG. 1 is a sectional view of an electromagnetic valve according to a first embodiment of the present invention.
Figure 2:
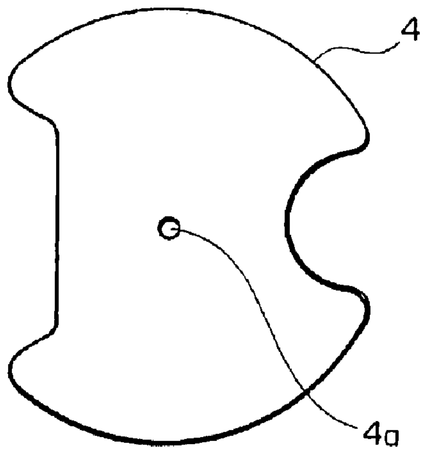
FIG. 2 is a front view of a plate employed for closing an end portion of a plunger chamber of the electromagnetic valve shown in FIG. 1.

FIG. 1 is a sectional view showing the electromagnetic valve according to a first embodiment of the present invention. FIG. 2 is a front view of a plate employed for blocking or closing an end portion of a plunger chamber of the electromagnetic valve shown in FIG. 1. Referring to the figures, the electromagnetic valve denoted generally by 100 is comprised of a case 1 made of a magnetic material substantially in a cylindrical form, a coil 2 wound in a cylindrical form and housed within the case 1, a bobbin 3 made of a resin material substantially in the form of a spool around which the coil 2 is wound and in which a cylindrical through-hole is formed along the longitudinal axis, a flat plate 4 made of a magnetic material and mounted on the case 1 at one end thereof, a cylindrical guide 5 made of a magnetic material and having one end closed by the plate 4 and other end portion extending into the through-hole of the bobbin 3, a yoke 6 made of a magnetic material in a planar form and disposed at an end face of the bobbin 3 oppositely to the plate 4, a plunger 8 of a substantially column-like shape housed within a plunger chamber 7 which is defined by a cylindrical space formed internally of the guide 5 and the bobbin 3 and whose both ends are closed by the plate 4 and the yoke 6, respectively, and a valve element 9 formed integrally with the plunger 8 at an end portion thereof located adjacent to the yoke 6. The plunger 8 and the valve element 9 constitute a plunger assembly denoted generally by reference numeral 10.

The electromagnetic valve 100 further includes a valve seat assembly 11 formed of a resin material integrally with the bobbin 3. There are formed in the valve seat assembly 11 an inlet port 12 serving as a high pressure port and drain or a discharge port 13 serving as a low pressure port. Further, a fluid passage 14 is formed in the valve seat assembly 11 so as to hydraulically interconnect the inlet port 12 and the drain or discharge port 13. A valve seat 15 is provided in the fluid passage 14 at an intermediate portion thereof. The valve element 9 mentioned above is adapted to open and close the fluid passage 14 in cooperation with the valve seat 15.

The inlet port 12 is hydraulically communicated to a controlled pressure region in which the pressure of a hydraulic medium or fluid is controlled to a predetermined level or value. On the other hand, the drain or discharge port 13 is an opening leading to a drainage region. When the pressure in the controlled pressure region is to be lowered to the pressure prevailing in the drainage region, the valve element 9 of the electromagnetic valve 100 is opened to allow the hydraulic medium or fluid to flow from the inlet port 12 to the discharge port 13 through the fluid passage 14 to thereby lower the pressure in the controlled pressure region. Further, by changing over the electrical energization and the electrical deenergization of the coil at a desired timing, the hydraulic pressure in the controlled pressure region can be so controlled as to be maintained at a predetermined level.

A narrow communicating passage **9*a* of a reduced or small diameter is pierced so as to extend through the valve element 9 along the center axis thereof. The communicating passage 9*a* is hydraulically communicated to a plunger inner space 8*a* formed internally of the plunger 8. A relief orifice (top hole) 4*a* is formed in the plate 4 at a position on the center or longitudinal axis of the plunger assembly 10. This sort of relief orifice (top hole) is also provided in the conventional electromagnetic valve for the purpose of preventing the plunger 8 from performing a so-called pumping operation when the viscosity of the fluid increases at a low temperature or for other reason. By contrast, in the electromagnetic valve according to the instant embodiment of the invention, the relief orifice (top hole) 4*a* is provided to allow the fluid to flow therethrough for the purpose of cooling the coil 2 in addition to the purpose mentioned just above, as will be described later on. Further, a coil cooling fluid sump space 2*a* is defined between the outer peripheral portion of the coil 2 and the inner wall of the case 1**.

Figure 3:
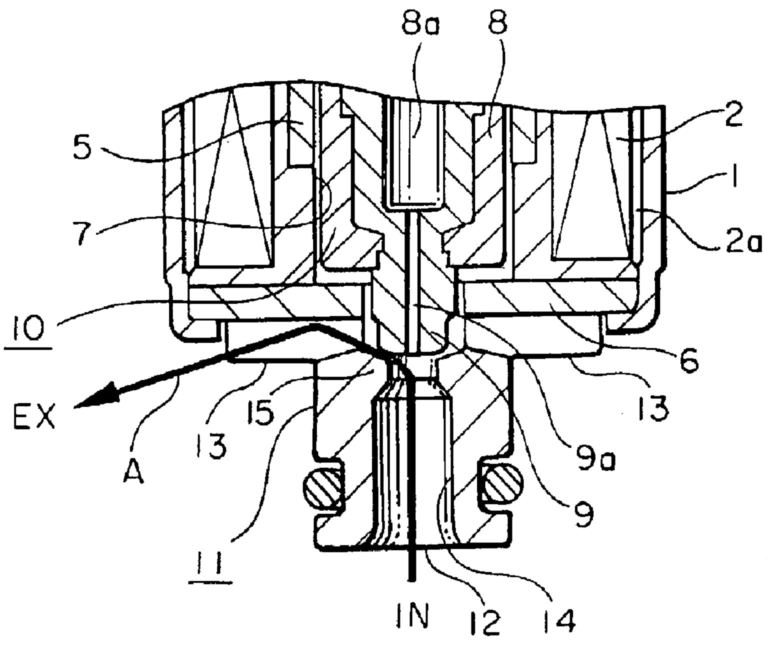
FIG. 3 is a fragmental sectional view showing the electromagnetic valve according to the first embodiment of the invention in the state where a plunger assembly is at a valve-opened position.
Figure 5:
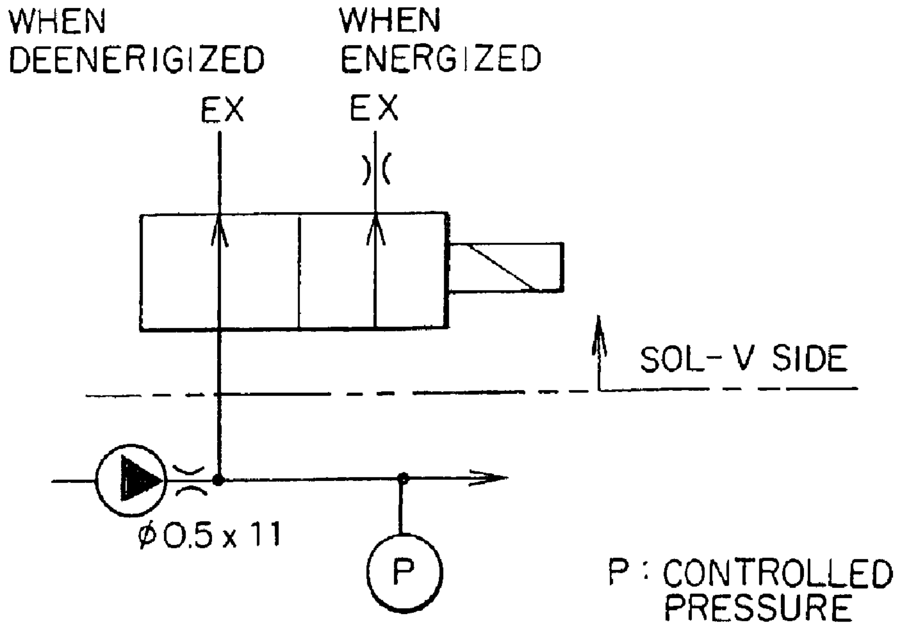
FIG. 5 is a diagram showing a hydraulic circuit of the electromagnetic valve shown in FIG. 1.

Now, description will be directed to the operation of the electromagnetic valve implemented in the structure described above. FIG. 3 is a fragmental sectional view showing the electromagnetic valve according to the instant embodiment of the invention in the state where the plunger assembly 10 is at the valve-opened position (i.e., the position at which the passage 14 is opened by the valve element 9). The hydraulic pressure prevailing in the controlled pressure region is constantly acting on the valve element 9. When the coil 2 is electrically deenergized (i.e. when no electric current is supplied to the coil 2), the plunger assembly 10 is urged to displace to the valve-opened position under the influence of the hydraulic pressure of the controlled pressure region. At this valve-opened position, the valve element 9 is detached from the valve seat 15. When the inlet port 12 is opened with the valve element 9 being detached from the valve seat 15, the hydraulic medium or fluid flows from the inlet (IN) port (controlled pressure region) to the discharge (EX) port (drainage region), as indicated by a solid arrow A in FIG. 3, as a result of which the control hydraulic pressure in the controlled pressure region is lowered (refer to a hydraulic circuit diagram shown in FIG. 5).

Figure 4:
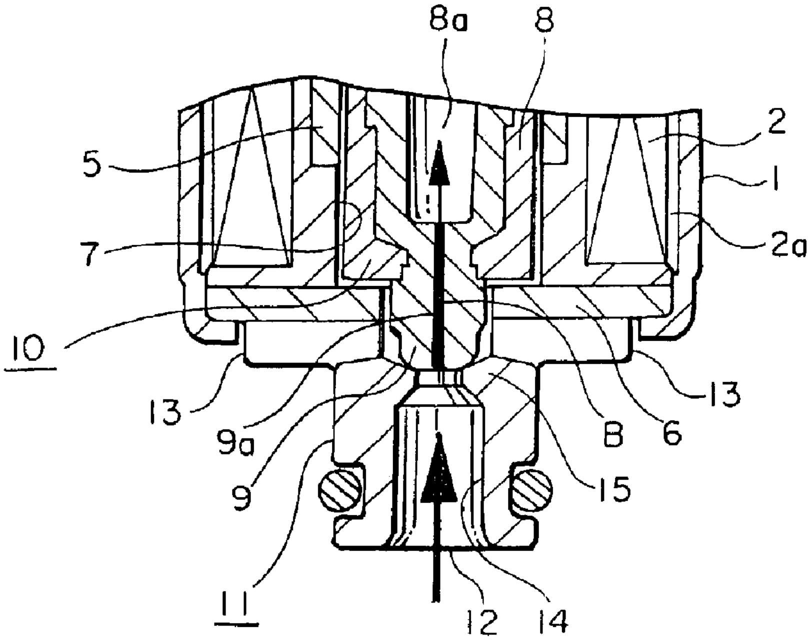
FIG. 4 is a fragmental sectional view showing the electromagnetic valve according to the first embodiment of the invention in the state where the plunger assembly is at a valve-closed position.

FIG. 4 is a fragmental sectional view showing the electromagnetic valve according to the instant embodiment of the invention in the state where the plunger assembly 10 is at the valve-closed position (i.e., the position at which the fluid passage 14 is closed by the valve element 9). When the coil 2 is electrically energized, the yoke 6 is magnetized. As a result of this, the plunger 8 is attracted toward the yoke 6 under the action of the magnetic attracting force of the yoke 6, whereby the valve element 9 bears against the valve seat 15 to thereby close the fluid passage 14. Consequently, the fluid flowing from the inlet or IN side (controlled pressure region) to the discharge or EX side (discharge or drainage region) is interrupted. Thus, the hydraulic pressure prevailing in the inlet port (controlled pressure region) is maintained as it is (refer to the hydraulic circuit diagram shown in FIG. 5).

In the conventional electromagnetic valve, the narrow communicating passage 9*a* is not provided in the valve element 9. Accordingly, upon electrical energization of the coil 2, no fluid can flow into the plunger chamber 7. By contrast, in the case of the electromagnetic valve according to the instant embodiment of the invention, the communicating passage 9*a* is formed in the valve element 9. Consequently, upon electrical energization of the coil 2, a small amount of hydraulic fluid can flow into the plunger inner space 8*a* through the communicating passage 9*a*, as indicated by a thick solid arrow B in FIG. 4. Parenthetically, control is so performed that in the controlled pressure region, higher pressure than the drainage region prevails. On the other hand, the pressure within the plunger inner space 8*a* is same as the pressure in the drainage region. Consequently, upon closing of the valve element 9 (i.e., when the valve element 9 is forced to bear on the valve seat 15 to block the fluid passage 14), the fluid flows into the coil cooling fluid sump space 2*a*.

The plunger chamber 7 is filled with the fluid flown into the plunger inner space 8*a*. The fluid then overflows through the relief orifice (top hole) 4*a* formed in the plate 4 to flow on and along the top surface of the plate 4 into the coil cooling fluid sump space 2*a* formed between the coil 2 and the case 1. At this juncture, it should be mentioned that in the electromagnetic valve according to the instant embodiment of the invention, the diameter of the relief orifice 4*a* is selected to be same as the inner diameter of the communicating passage 9*a* so that the fluid is collected within the plunger inner space 8*a*. Thus, the narrow communicating passage 9*a*, the plunger inner space 8*a* and the plate 4 cooperate to constitute a coil cooling fluid passage which is provided so as to communicate the controlled pressure region to the coil cooling fluid sump space 2*a*. Further, it should be added that the diameter of the communicating passage 9*a* is selected to be sufficiently small so as not to exert influence to the hydraulic pressure in the controlled pressure region.

As is apparent from the above description, the electromagnetic valve 100 according to the instant embodiment of the invention includes the valve seat assembly 11 which includes the inlet (IN) port 12 leading to the controlled pressure region of high pressure, the discharge (EX) port 13 leading to the drainage region of low pressure, the fluid passage 14 formed between the inlet port 12 and the discharge port 13 and the valve seat 15 formed in the fluid passage 14. Further, the electromagnetic valve 100 includes the plunger 8 disposed slideably reciprocatively within the column-like hollow chamber 7 and the valve element 9 provided at one end of the plunger 8 to open and close the fluid passage 14 in cooperation with the valve seat 15.

Furthermore, the electromagnetic valve 100 includes the plunger assembly 10 resiliently urged to the valve-opened position at which the fluid passage 14 is opened by the valve element 9 under the hydraulic pressure prevailing in the controlled pressure region when the coil 2 is electrically deenergized, and the coil 2 housed within the case 1 for driving the plunger 8 upon electrical energization thereof to thereby displace the plunger assembly 10 to the valve-closed position at which the fluid passage 14 is closed by the valve element 9, the coil cooling fluid sump space 2*a* defined between the coil 2 and the case 1 and the coil cooling fluid passage including the narrow communicating passage 9*a* provided so as to communicate the controlled pressure region to the coil cooling fluid sump space 2*a* without exerting influence to the hydraulic pressure in the controlled pressure region. By virtue of the structure of the electromagnetic valve mentioned above, the fluid can flow into the plunger inner space 8*a* and the coil cooling fluid sump space 2*a* in the state where the coil 2 is electrically deenergized. Thus, the heat generated by the coil 2 is transferred to the flowing fluid, as a result of which the temperature of the coil 2 is prevented from increasing. Thus, the temperature rise of the coil 2 is effectively suppressed even when the coil is electrically energized continuously over an extended time period which in turn means that the attracting force can be protected against lowering, which may otherwise occur in accompanying the temperature rise of the coil. By virtue of this feature, the coil can be implemented compactly in a miniature size.

The diameter and the length of the communicating passage 9*a* should be selected in consideration of the volume of the controlled pressure region, leakage of the fluid permeating between the individual constituent parts so that the influence to the controlled pressure can be suppressed to a possible minimum.

The temperature of the coil 2 will change in dependence on the ambient temperature, temperature of the fluid, the structure of the electromagnetic valve and other factors. By way of example, in the conventional electromagnetic valve apparatus, it has experimentally been observed that the temperature of the coil has reached 210 .C at the ambient temperature of 140 .C when the coil has been electrically energized continuously for a predetermined time in the state in which no fluid flows around or in the vicinity of the coil 2. By contrast, in the electromagnetic valve according to the instant embodiment of the invention in which the diameter of the communicating passage 9*a* is 0.5 mm and the length thereof is 11 mm, it has been found that the coil temperature rise was up to 155 .C under the same conditions as mentioned above. In other words, in the electromagnetic valve according to the instant embodiment of the invention, reduction of the temperature by ca. 55 .C could be realized without involving lowering of the hydraulic pressure in the controlled pressure region.

At this juncture, it should be added that in the electromagnetic valve according to the instant embodiment of the invention, the coil cooling fluid sump space 2*a* is provided as a fine gap between the coil 2 and the case 1. However, the coil cooling fluid sump space 2*a* need not necessarily be provided positively, but a space which is unavoidably formed due to machining errors involved in the manufacturing as well as errors in winding of the coil and the assembling may be made use of as the coil cooling fluid sump space 2*a*. Accordingly, it is safe to say that the structure of the electromagnetic valve according to the instant embodiment of the invention can be realized by providing the communicating passage 9*a* and the plunger inner space 8*a* without providing positively the coil cooling fluid sump space 2*a*.

Embodiment 2

Figure 6:
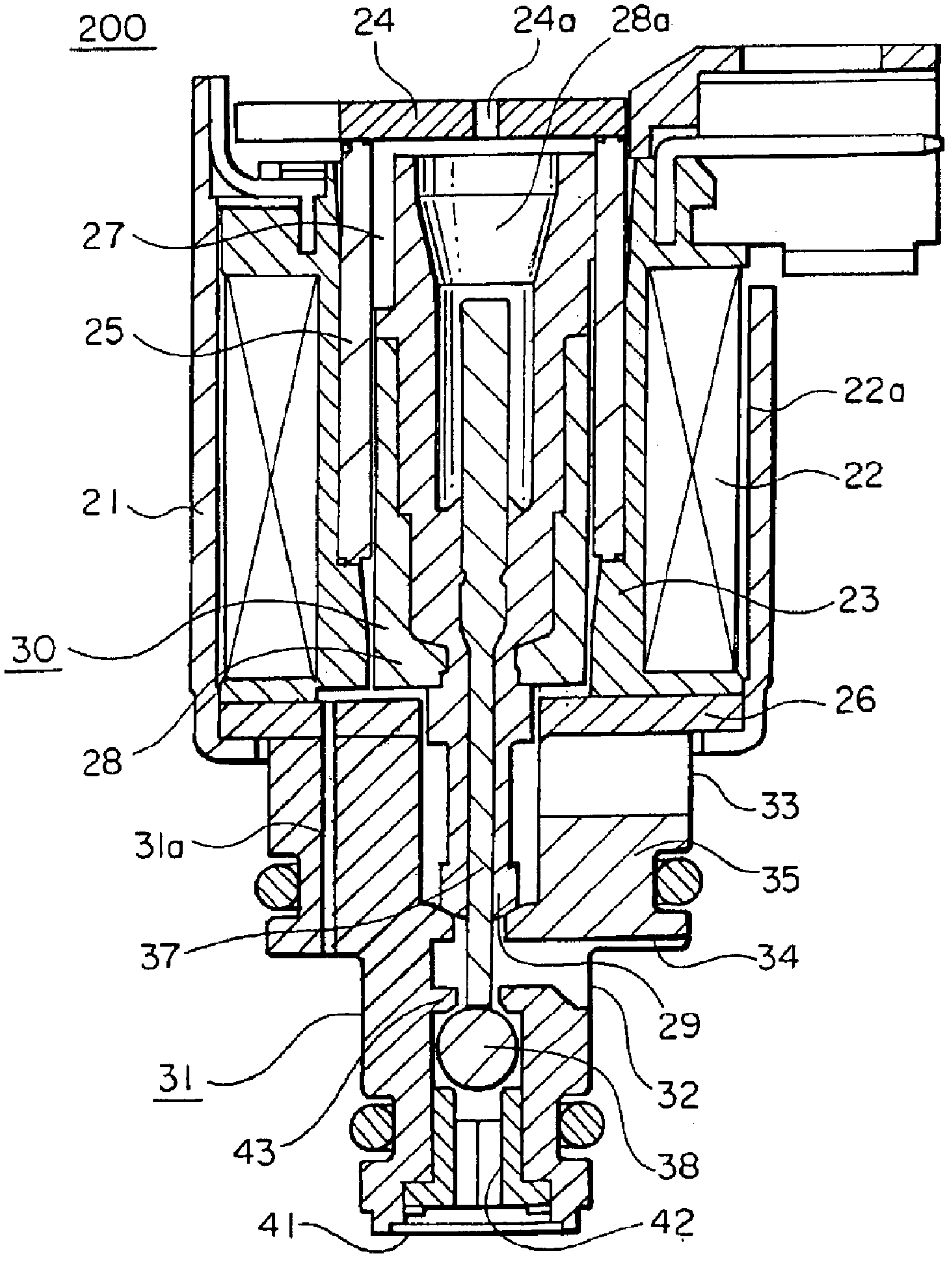
FIG. 6 is a sectional view of the electromagnetic valve according to a second embodiment of the present invention.
Figure 7:
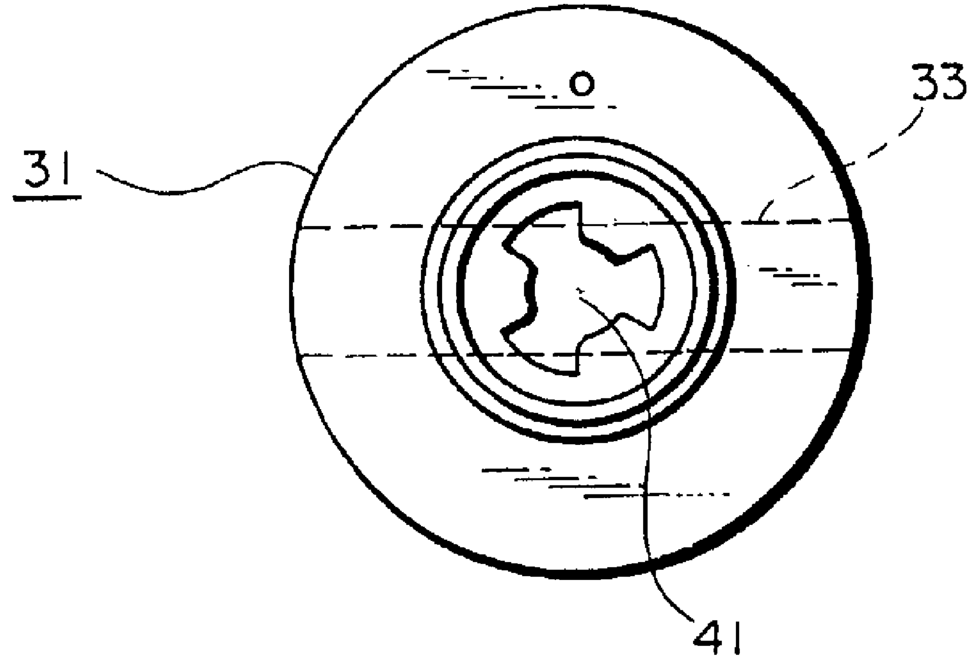
FIG. 7 is a view showing a valve seat assembly of the electromagnetic valve shown in FIG. 6, as viewed from a bottom thereof.

FIG. 6 is a sectional view showing the electromagnetic valve according to a second embodiment of the present invention. FIG. 7 is a view showing a valve seat assembly of the electromagnetic valve shown in FIG. 6, as viewed from the bottom side thereof. Referring to the figures, the electromagnetic valve denoted generally by 200 is comprised of a case 21 made of a magnetic material substantially in a cylindrical form, a coil 22 wound in a cylindrical form and housed within the case 21, a bobbin 23 made of a resin material substantially in the form of a spool around which the coil 22 is wound and in which a cylindrical through-hole is formed along the longitudinal axis, a flat plate 24 made of a magnetic material and mounted on the case 21 at one end thereof, a cylindrical guide 25 made of a magnetic material and having one end closed by the plate 24 and other end portion extending into the through-hole of the bobbin 23, a yoke 26 made of a magnetic material in a planar form and disposed at an end face of the bobbin 23 oppositely to the plate 24, a plunger 28 of a substantially column-like shape housed within a plunger chamber 27 which is defined by a cylindrical space formed internally of the guide 25 and the bobbin 23 and whose both ends are closed by the plate 24 and the yoke 26, respectively, a rod 37 connected integrally to the plunger 28 at an end portion thereof located adjacent to the yoke 26, a first valve element 29 of a conical shape provided at an intermediate portion of the rod 37 and a second valve element 38 of a ball-like shape disposed so as to contact with the tip end portion of the rod 37. The plunger 28, the rod 37 and the first valve element 29 constitute a plunger assembly denoted by reference numeral 30.

The electromagnetic valve 200 further includes a valve seat assembly 31 formed of a resin material integrally with the bobbin 23. There are formed in the valve seat assembly 31 an outlet port 32 serving as a high pressure port, a drain or discharge port 33 serving as a low pressure port and an inlet port 41 serving as a third port. Further, a first fluid passage 34 is formed in the valve seat assembly 31 so as to hydraulically interconnect the outlet port 32 and the drain or discharge port 33. Furthermore, a second fluid passage 42 is formed between the third or inlet port 41 and the outlet port 32. A first valve seat 35 is provided in the first fluid passage 34 at an intermediate portion thereof. The first valve element 29 mentioned above is adapted to open and close the first fluid passage 34 in cooperation with the first valve seat 35. A second valve seat 43 is provided in the second fluid passage 42 at an intermediate portion thereof. The second valve element 38 mentioned above is adapted to open and close the second fluid passage 42 in cooperation with the second valve seat 43.

The outlet port 32 functioning as a high pressure port is hydraulically communicated to a controlled pressure region in which the pressure of a hydraulic medium or fluid is controlled to a predetermined level or value. On the other hand, the drain or discharge port 33 functioning as a low pressure port constitutes an opening leading to a drainage region of a lower pressure than that prevailing in the controlled pressure region. When the pressure in the controlled pressure region is to be lowered to the pressure prevailing in the drainage region, the first valve element 29 of the electromagnetic valve 200 is opened to allow the hydraulic medium or fluid to flow from the outlet port 32 to the discharge port 33 through the fluid passage 34 to thereby lower the pressure in the controlled pressure region. Further, when the pressure in the controlled pressure region is to be increased up to the pressure prevailing at the input or inlet side, the second valve element 38 is changed over to the open position to thereby allow the fluid to flow from the inlet port 41 to the outlet port 32, as a result of which the pressure in the controlled pressure region becomes same as the pressure in the inlet port 41. Further, by changing over the electrical energization and the electrical deenergization of the coil at a desired timing, the hydraulic pressure in the controlled pressure region can be so controlled as to be maintained at a predetermined level.

A narrow communicating passage 31*a* of a reduced or small diameter is pierced so as to extend through the valve seat assembly 31 at a position deviated from the center axis thereof. The communicating passage 31*a* has an opening formed in the surface located oppositely to the outlet side (controlled pressure region), i.e., the surface extending continuously to the outlet port 32, while the other end portion of the communicating passage 31*a* extends through the yoke 26. Further, the communicating passage 31*a* is communicated to the plunger chamber 27 by way of a gap formed between the bobbin 23 and the yoke 26. A relief orifice (top hole) 24*a* is formed in the plate 24 at a position on the center or longitudinal axis of the plunger assembly 30. This sort of relief orifice (top hole) is also provided in the conventional electromagnetic valve for the purpose of preventing the plunger 28 from performing a so-called pumping operation when the viscosity of the fluid increases at a low temperature or for other reason. By contrast, in the electromagnetic valve according to the instant embodiment of the invention, the relief orifice 24*a* is provided to allow the fluid to flow therethrough for the purpose of cooling the coil 22 in addition to the purpose mentioned just above, as will be described in more detail later on. Further, a coil cooling fluid sump space 22*a* is defined between the outer peripheral portion of the coil 22 and the inner wall of the case 21.

Figure 8:
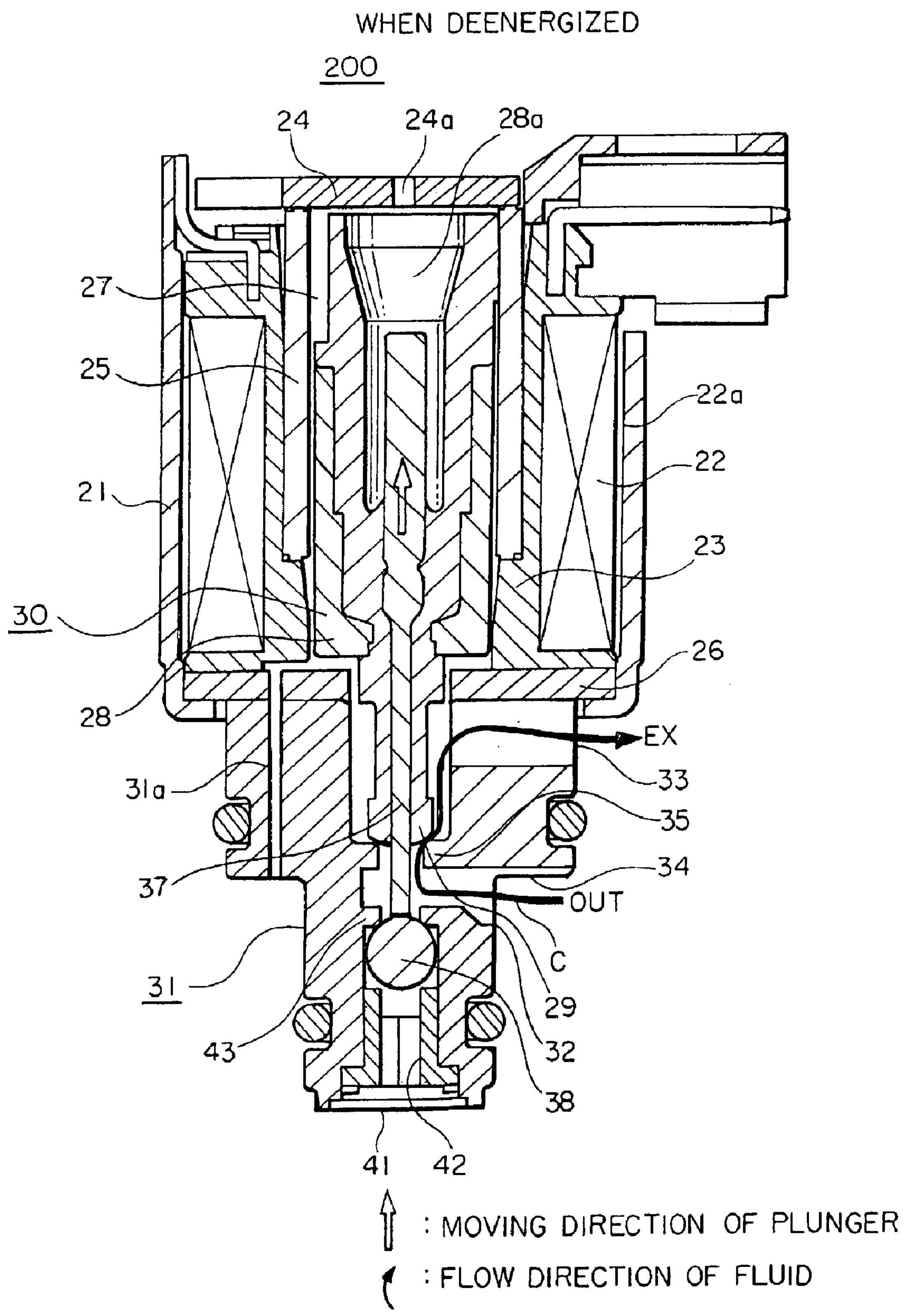
FIG. 8 is a sectional view showing the electromagnetic valve according to the second embodiment of the invention in the state where a plunger assembly is at a valve-opened position.
Figure 10:
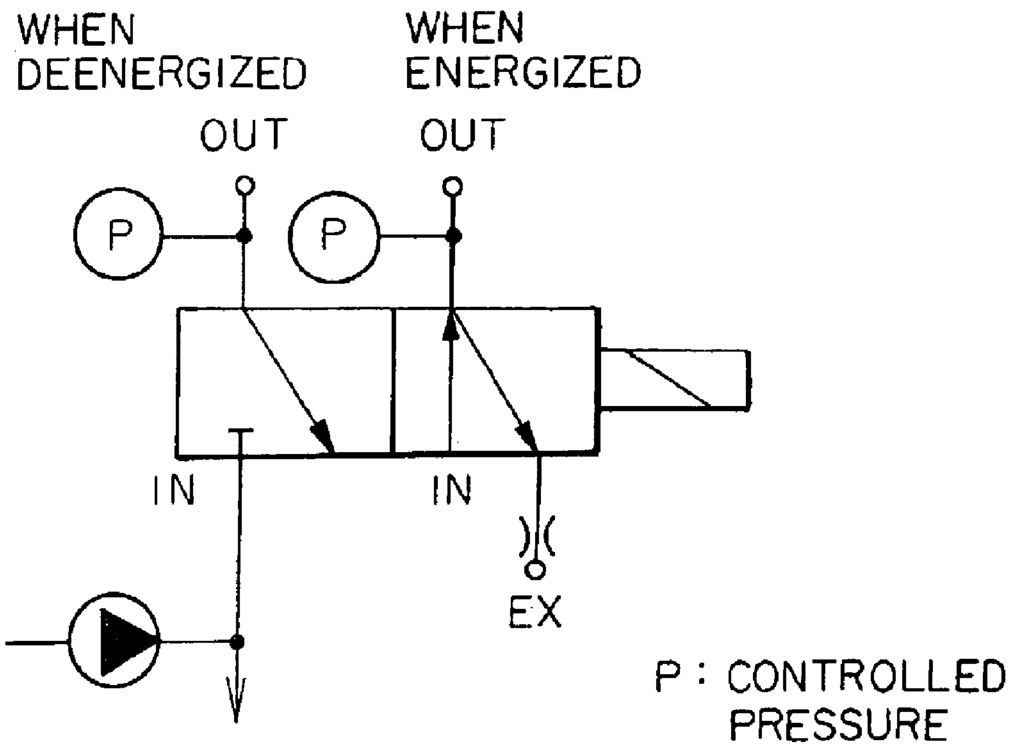
FIG. 10 is a diagram showing a hydraulic circuit of the electromagnetic valve shown in FIG. 6.

Now, description will be directed to the operation of the electromagnetic valve implemented in the structure described above. FIG. 8 is a sectional view showing the electromagnetic valve according to the instant embodiment of the invention in the state where the plunger assembly 30 is at the valve-opened position (i.e., the position at which the passage 34 is opened by the first valve clement 29). The hydraulic pressure prevailing in the controlled pressure region is constantly acting on the first valve element 29. When the coil 22 is electrically deenergized (i.e., when no electric current is supplied to the coil 22), the plunger assembly 30 is urged to displace to the valve-opened position under the influence of the hydraulic pressure in the controlled pressure region. At this valve-opened position, the first valve element 29 is detached from the first valve seat 35. When the inlet port 12 is opened with the first valve element 29 being detached from the first valve seat 35, the hydraulic medium or fluid flows from the outlet (OUT) port (controlled pressure region) to the discharge (EX) port (discharge or drainage region), as indicated by a thick solid arrow C in FIG. 8, as a result of which the hydraulic pressure in the controlled pressure region becomes lowered. At this time point, the second valve element 38 is closed (refer to a hydraulic circuit diagram shown in FIG. 10).

Figure 9:
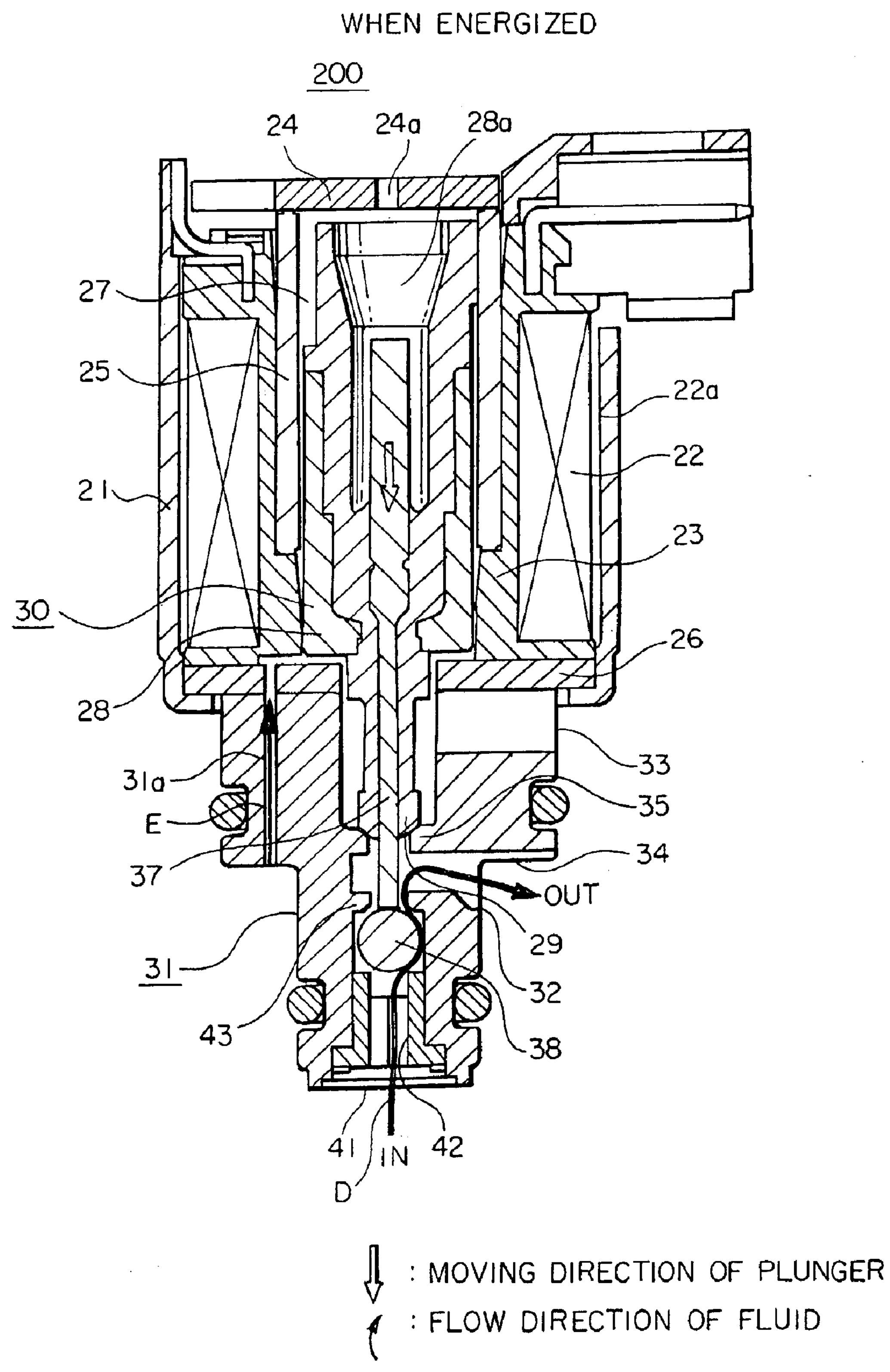
FIG. 9 is a sectional view showing the electromagnetic valve according to the second embodiment of the invention in the state where the plunger assembly is at a valve-closed position.

FIG. 9 is a fragmental sectional view showing the electromagnetic valve according to the instant embodiment of the invention in the state where the plunger assembly 30 is at the valve-closed position (i.e., the position at which the passage 34 is closed by the first valve element 29). When the coil 22 is electrically energized, the yoke 26 is magnetized, as a result of which, the plunger 28 is attracted toward the yoke 26 under the action of the magnetic attracting force of the yoke 26, whereby the first valve element 29 bears against the valve seat 35 to thereby close the first fluid passage 34. Consequently, the fluid flowing from the outlet or OUT side (controlled pressure region) to the discharge or EX side (drainage region) is interrupted. On the other hand, the second valve element 38 is opened. The hydraulic medium or fluid flows from the inlet (IN) port to the outlet (OUT) port (controlled pressure region), as indicated by a thick solid arrow D in FIG. 9. As a result of this, the hydraulic pressure in the controlled pressure region is controlled to the same pressure as that in the inlet (IN) port (refer to the hydraulic circuit diagram shown in FIG. 10).

In the conventional three-way electromagnetic valve, the narrow communicating passage 31*a* is not provided in the valve seat assembly 31. Accordingly, upon electrical energization of the coil 22, no fluid can flow into the plunger chamber 27. By contrast, in the case of the electromagnetic valve according to the instant embodiment of the invention, the communicating passage 31*a* is formed in the valve seat assembly 31. Consequently, upon electrical energization of the coil 22, a small amount of hydraulic fluid can flow into the plunger chamber 27 through the communicating passage 31*a*, as indicated by a thick solid arrow E in FIG. 9. The plunger chamber 27 is thus filled with the fluid. The fluid then flows into the plunger inner space 28*a*. Ultimately, the fluid overflows through the relief orifice (top hole) 24*a* formed in the plate 24 to flow on and along the top surface of the plate 24 into the coil cooling fluid sump space 22*a* formed between the coil 22 and the case 21. At this juncture, it should be mentioned that in the electromagnetic valve according to the instant embodiment of the invention, the diameter of the relief orifice 24*a* is selected to be same as the inner diameter of the communicating passage 31*a* so that the fluid is collected within the plunger chamber 27. Thus, the narrow communicating passage 31*a*, the plunger chamber 27 and the relief orifice 24*a* formed in the plate 24 cooperate to constitute a coil cooling fluid passage which functions communicate the controlled pressure region to the coil cooling fluid sump space 22*a*. In this conjunction, it should be mentioned that the diameter of the communicating passage 31*a* is selected to be sufficiently small so as not to exert influence to the hydraulic pressure prevailing in the controlled pressure region.

As is apparent from the above description, the electromagnetic valve according to the instant embodiment of the invention includes the valve seat assembly. 31 which is composed of the inlet port 41 maintained at a high pressure, the second fluid passage 42 formed between the inlet port 41 and the outlet port 32, and the second valve seat 43 formed in the second fluid passage 42. On the other hand, the plunger assembly 30 has the second valve element 38 which serves to open and close the second fluid passage 42 in cooperation with the second valve seat 43. The second valve element 38 is adapted to close the second fluid passage 42 when the plunger assembly 30 is at the valve-opened position while opening the second fluid passage 42 when the plunger assembly 30 is at the valve-closed position.

In the electromagnetic valve of the structure described above, the valve seat assembly 31 has the coil cooling fluid passage for communicating the coil cooling fluid sump space 22*a* to the controlled pressure region. By virtue of the structure of the electromagnetic valve mentioned above, the fluid can flow into the plunger chamber 27 and the coil cooling fluid sump space 22*a* in the state where the coil 22 is electrically deenergized. Thus, the heat generated by the coil 22 is transferred to the flowing fluid, as a result of which the temperature of the coil 22 is prevented from increasing. Thus, the temperature rise of the coil 22 is effectively suppressed even when the coil is electrically energized continuously over an extended time period, which in turn means that the attracting force can be protected against lowering, which may otherwise occur in accompanying the temperature rise of the coil. By virtue of this feature, the coil can be implemented compactly in a miniature size.

At this juncture, it is to be added that although the relief orifice 24*a* is formed in the plate 24 in the electromagnetic valve according to the instant embodiment of the invention with a view to allowing the fluid to flow through the orifice 24*a*, the relief orifice (top hole) 24*a* is not indispensably required but may be spared, since the fluid filling the plunger chamber 27 penetrates into the coil cooling fluid sump space 22*a* through fine gaps making appearance among the individual components to be collected therein.

Further, the coil cooling fluid sump space 22*a* need not necessarily be provided for the reason described in conjunction with the first embodiment of the invention. Gaps formed due to fabrication errors may be used to this end. More specifically, in the case of the electromagnetic valve according to the instant embodiment of the invention, the coil cooling fluid sump space 22*a* is provided between the coil 22 and the case 21 so that the fluid can easily flow therethrough. However, gaps functionally equivalent to the coil cooling fluid sump space 22*a* may unavoidably be formed due to the machining errors as well as the winding and assembling errors in the manufacture of the electromagnetic valve and thus these gaps may be used in place of the coil cooling fluid sump space 22*a*. In this case, the electromagnetic valve of the structure described above can be realized only by additionally providing the communicating passage 31*a* when compared with the conventional electromagnetic valve.

Further, in the electromagnetic valve according to the instant embodiment of the invention, the entrance of the communicating passage 31*a* is formed in the surface located in opposition to the outlet (OUT) side (controlled pressure region). It should however be noted that the position of the inlet port of the communicating passage 31*a* is not restricted to that mentioned just above. In other words, what is important is that the communicating passage 31*a* is opened in the space which is filled with the fluid at a higher pressure than the plunger chamber 27 so that the communicating passage 31*a* communicates the above-mentioned space and the plunger chamber 27 to each other.

Embodiment 3

Figure 11:
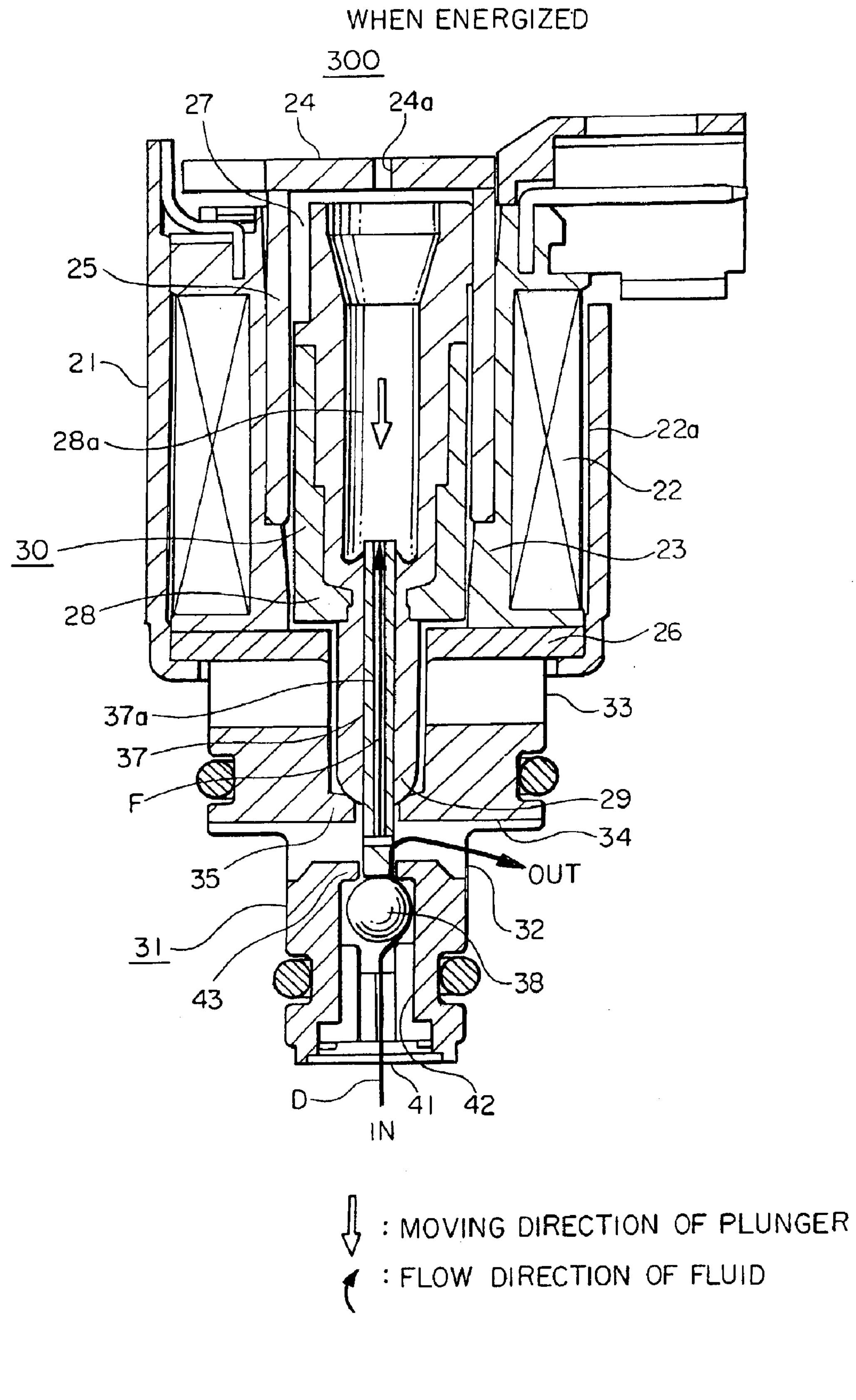
FIG. 11 is a sectional view showing the electromagnetic valve according to a third embodiment of the present invention in the state where a plunger assembly is at a valve-closed position.

FIG. 11 is a sectional view showing the electromagnetic valve according to a third embodiment of the present invention in the state where the plunger assembly is at the valve-closed position. In the electromagnetic valve denoted generally by reference numeral 300, a part of the coil cooling fluid passage is realized in the form of a communicating passage 37*a* which extends through the rod 37 along the center axis thereof. The communicating passage 37*a* is opened into the plunger inner space 28*a* formed internally of the plunger 28. The communicating passage 37*a* has a same inner diameter as that of the relief orifice (top hole) 24*a* so that the fluid stays within the plunger inner space 28*a*.

The other structural features of the electromagnetic valve according to the instant embodiment of the invention are essentially same as the electromagnetic valve described hereinbefore in conjunction with the second embodiment of the invention.

With the electromagnetic valve of the structure described above, substantially same effects as those of the electromagnetic valve according to the second embodiment of the invention can be obtained.

Embodiment 4

Figure 12:
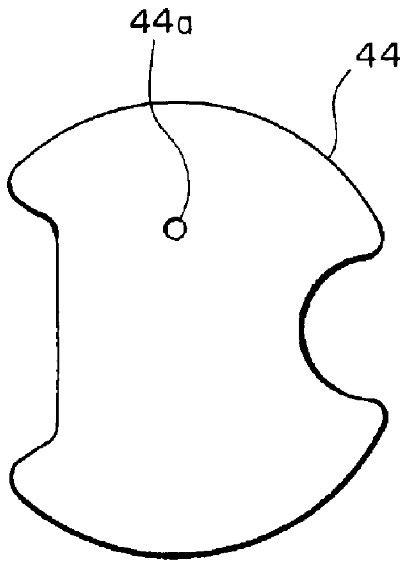
FIG. 12 is a front view showing a plate employed for closing an end portion of a plunger chamber of the electromagnetic valve according to a fourth embodiment of the invention.

FIG. 12 is a front view showing the plate 44 which is employed for closing the end portion of the plunger chamber of the electromagnetic valve according to the fourth embodiment of the invention. As can be seen in the figure, the relief orifice (top hole) 44a formed in the plate 44 is not located on a prolonged line of the longitudinal axis of the communicating passage 37a extending through the rod 37 of the plunger assembly 30. In other words, the relief orifice (top hole) 44a formed in the plate 44 is located at a position offset or deviated from the center axis of the plunger 28.

The other structural features of the electromagnetic valve according to the instant embodiment of the invention are essentially same as the electromagnetic valve described hereinbefore in conjunction with the second embodiment of the invention.

In the electromagnetic valve of the structure described above, it is possible to prevent the fluid from spilling or flowing out from the relief orifice (top hole) 44a when viscosity of the fluid is low.

Embodiment 5

Figure 13:
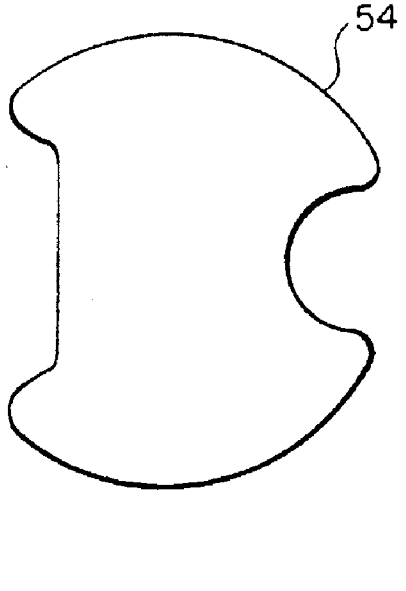
FIG. 13 is a front view showing a plate employed for closing an end portion of a plunger chamber of the electromagnetic valve according to a fifth embodiment of the invention.

FIG. 13 is a front view of a plate employed for blocking or closing an end portion of the plunger chamber of the electromagnetic valve according to the fifth embodiment of the invention. In the electromagnetic valve according to the instant embodiment of the invention, no relief orifice (top hole) is provided in the plate 54. To say in another way, the plate 54 constituting a wall for the plunger chamber 27 on the side corresponding to the valve-opened position as viewed in the direction in which the plunger is displaced within the plunger chamber 27 tightly closes the plunger chamber 27.

The other structural features of the electromagnetic valve according to the instant embodiment of the invention are essentially same as those of the electromagnetic valve described hereinbefore in conjunction with the second embodiment of the invention.

In the electromagnetic valve of the structure described above, it is possible to prevent the fluid from spilling or flowing out (from the relief orifice) without fail when viscosity of the fluid is low.

In the electromagnetic valve in which the plate 54 is not formed with the relief orifice (top hole), the fluid filling the plunger chamber 27 can penetrate into the coil cooling fluid sump space 22a through small gaps formed among the individual constituent parts to be accumulated within the coil cooling fluid sump space 22a. Thus, substantially same advantageous effects as those of the electromagnetic valves described hereinbefore in conjunction wit the first to fourth embodiments can equally be obtained.

Many modifications and variations of the present invention are possible in the light of the above techniques. It is therefore to be understood that within the scope of the appended claims, the invention may be practiced otherwise than as specifically described.

What is claimed is:

1. An electromagnetic valve, comprising:

a valve seat assembly including a high pressure port opened in a controlled pressure region of a high pressure, a low pressure port opened in a drainage region of a low pressure, a fluid passage formed between said high pressure port and said low pressure port and a valve seat formed in said fluid passage;

a plunger assembly including a plunger disposed to be slideable reciprocatively within a column-like hollow plunger chamber and a valve element provided at one end portion of said plunger so as to open and close said fluid passage in cooperation with said valve seat;

a coil housed within a case for driving said plunger upon electrical energization of said coil to thereby displace said plunger assembly to a valve-closed position at which said fluid passage is closed by said valve element while upon electrical deenergization of said coil, said plunger assembly is displaced to a valve-opened position at which said fluid passage is opened by said valve element under the influence of hydraulic pressure prevailing in said controlled pressure region;

a coil cooling fluid sump space provided between an outer peripheral portion of said coil and said case; and a coil cooling fluid passage provided so as to communicate said coil cooling fluid sump space with said controlled pressure region for allowing a fluid to flow into said coil cooling fluid sump space from said controlled pressure region, said coil cooling fluid passage including a small-diameter communicating passage portion provided so as not to exert influence to the hydraulic pressure prevailing in said controlled pressure region.

2. An electromagnetic valve according to claim 1, wherein said valve seat assembly includes a third port opened in a region of high pressure, a second fluid passage formed between said third port and said high pressure port and a second valve seat formed in said second fluid passage, and wherein said plunger assembly further includes a second valve element for opening and closing said second fluid passage in cooperation with said second valve seat, said second valve element closes said second fluid passage at said valve-opened position while opening said second fluid passage at said valve-closed position.

3. An electromagnetic valve according to claim 1, wherein said small-diameter communicating passage portion which is communicated with said coil cooling fluid sump space is so formed in said plunger assembly as to extend along a direction in which said plunger assembly is displaced.

4. An electromagnetic valve according to claim 1, wherein said small-diameter communicating passage portion communicating with said coil cooling fluid sump space is formed in said valve seat assembly.

5. An electromagnetic valve according to claim 1, wherein said plunger chamber forms a part of said coil cooling fluid passage communicating said small-diameter communicating passage portion to said coil cooling fluid sump space, and wherein a relief orifice is formed in a plate which constitutes a wall of said plunger chamber located in opposition to said valve element, said relief orifice being pierced at a position deviated from a center axis of said plunger.

6. An electromagnetic valve according to claim 1, wherein said plunger chamber forms a part of said coil cooling fluid passage communicating said small-diameter communicating passage portion to said coil cooling fluid sump space, and wherein a plate constituting a wall of said plunger chamber on a side opposite to said valve element tightly closes said plunger chamber on said side.

* * * * *